April 6, 1965 YOSHIRO MORIGUCHI 3,177,054

COMPOUND FOIL FOR CONNECTING ELECTRODES TO SEMICONDUCTOR MATERIAL

Filed Nov. 17, 1961

INVENTOR
YOSHIRO MORIGUCHI
BY Roy C. Haygood
ATTORNEY

United States Patent Office 3,177,054
Patented Apr. 6, 1965

3,177,054
COMPOUND FOIL FOR CONNECTING ELECTRODES TO SEMICONDUCTOR MATERIAL

Yoshiro Moriguchi, Tokyo, Japan, assignor to Nippon Electric Company Limited, Tokyo, Japan, a corporation of Japan Filed Nov. 17, 1961, Ser. No. 153,045
Claims priority, application Japan, Dec. 14, 1960, 35/49,149
4 Claims. (Cl. 29—199)

This invention relates to a compound foil for connecting an electrode to a semiconductor material, and more particularly to a gold-antimony alloy foil containing more than 1% of antimony by weight.

Gold-antimony alloy foils have been used in the past to connect electrodes to semiconductor materials, and it has been known in the past that the electrical characteristics of the electrode junction formed thereby would be improved if the antimony content of the foil exceeded 1% by weight. In the prior art, however, it has not been possible to achieve this desired end because of the physical limitations of gold-antimony alloys. In the first place, the solubility of antimony in molten gold is only approximately 0.7% by weight, whereby it is difficult to obtain a homogeneous alloy containing more than 0.7% antimony. If more than 0.7% of antimony is added to the molten gold, the excess antimony will segregate from the alloy when it is allowed to solidify. Furthermore the ductility of the alloy drops very rapidly as the antimony content is increased, whereby it becomes very difficult to roll the alloy into a thin foil when the antimony content approaches 1% by weight. For these reasons, it has been customary in the past to use an alloy having an antimony content of 1% or less, even though it has been known that the electrical characteristics of the junction formed by the foil would be improved by using more than 1% of antimony.

Accordingly, one object of this invention is to provide a gold-antimony foil having an antimony content of greater than 1% by weight.

Another object of this invention is to provide a method of forming a homogeneous gold-antimony alloy having an antimony content of greater than 1% by weight.

A further object of this invention is to provide an improved foil for connecting electrodes to semiconductor materials.

Other objects and advantages of this invention will be apparent to those skilled in the art from the following description of several specific embodiments thereof, as illustrated in the attached drawings, in which.

Figure 1:
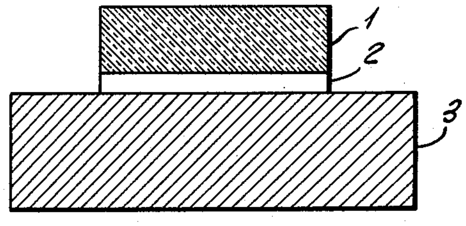
FIG. 1 shows an electrode connected to a semiconductor material via a prior art gold-antimony alloy foil.

Referring to FIG. 1, a prior art gold-antimony foil 2 which contains less than 1% of antimony by weight is shown connecting a metal 3 to a semiconductor material 1. In accordance with prior art alloying techniques, this connection is made by applying a slight pressure to the three materials and heating them until the gold-antimony foil 2 fuses with semiconductor material 1. Although this prior art connection is workable, its electrical characteristics can be greatly improved by using a gold-antimony foil having more than 1% of antimony by weight.

Figure 2A:
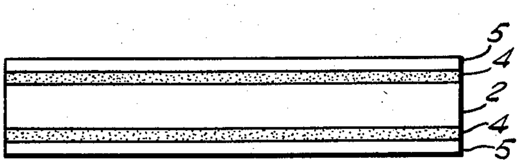
FIG. 2A shows one embodiment of the compound foil of this invention.
Figure 2B:
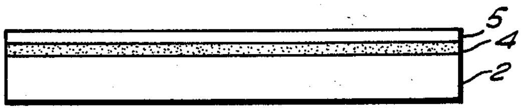
FIG. 2B shows a second embodiment of the compound foil of this invention.
Figure 2C:
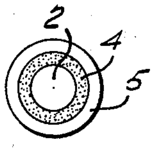
FIG. 2C shows a third embodiment of the compound foil of this invention.

FIGS. 2A, 2B, and 2C shows three examples of the compound foil of this invention, which overcome the prior art impediments to having more than 1% of antimony in a gold-antimony alloy foil. As shown in FIGS. 2A and 2B, a coating of antimony 4 having a desired thickness is formed on one or both surfaces of a pure gold foil or a prior art gold-antimony foil 2 which contains less than 1% of antimony. This antimony coating can be applied by any suitable prior art technique, such as metallizing, evaporating, or the like. If necessary, antimony coating 4 can be fused with foil 2 by heating the coated foil in an inert gas such as nitrogen, argon, or the like. Next, a coat of pure gold or prior art gold-antimony alloy 5 is deposited on antimony coating 4 by metallizing, evaporating, or other techniques, thus forming the compound foil of this invention. Coating 5 can be fused with coating 4 if desired by heating the compound foil in an inert gas. The thickness of foil 2 and coatings 4 and 5 are preferably controlled to give a desired compound foil thickness, and the finished foil can be rolled slightly if necessary to get an exact thickness. It has been found that a compound gold-antimony foil having two or more percent of antimony by weight can be easily formed by the above described process, and that this compound foil will form a good attachment to silicon or germanium because of the relatively low concentration of antimony on the surface of the foil.

Figure 3:
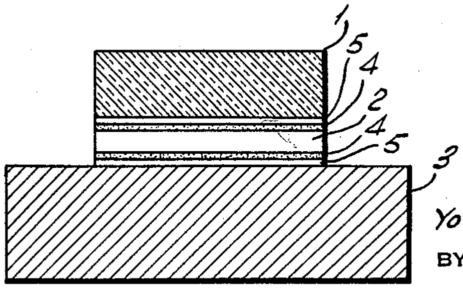
FIG. 3 shows an electrode connected to a semiconductor material via the compound foil of this invention.

The compound foil obtained by above mentioned processes is used to form a connection between a semiconductor and an electrode by putting the said compound foil between a semiconductor base 1 and electrode metal 3 as shown in FIG. 3 and by heating this arrangement with slight pressure. The gold coat 5 on the surface of the said compound foil first forms an alloy with the surface of the semiconductor base 1, then the antimony coat 4 and the gold-antimony foil 2 at the inner part of the compound foil fuse into the said alloy and thus the alloy of semiconductor, gold, and antimony is formed. This alloy of semiconductor, gold, and antimony acts as a solder and makes a good junction of the semiconductor base 1 and the electrode metal 3. In this case, a high concentration of antimony occurs at the semiconductor base which is near an eutectic part formed by gold and the semiconductor base, and forms a so-called $N^+$ part, which makes a good ohmic connection for N type semiconductor materials, and which makes possible a rectifying junction for P type semiconductor materials. In our experiments, it has been found easy to make an alloy junction with P type and N type silicone by using the gold-antimony compound foil including antimony of above 2%, which has remarkably improved the electrical characteristics of the junction.

While the invention has been described in detail in connection with a gold-antimony compound foil, the compound foil of this invention is not restricted to gold and antimony, but can be made of an impurity element of 3 or 5 valences and any metal, such as gold, silver, aluminum or the like, which can be fused to a semiconductor material. Moreover, a compound wire formed as a wire, not a compound foil, may be desired in some applications where the semiconductor and metal have a certain type junction structure. FIG. 2C shows a sectional view of the said compound wire which comprises a pure gold or a gold-antimony wire 2 including a bit of antimony, an antimony coat 4, and a pure gold or a gold-antimony coat 5 including a bit of antimony. This compound wire can form a good connection when used as a lead wire to the semiconductor base.

As it has been previously mentioned, according to this invention, it is possible to obtain a good connection between an electrode and a semiconductor material by using the compound foil arrangement including a large percentage of an impurity element of 3 or 5 valences, such as antimony or the like, which has heretofore been impossible with the prior art techniques. And it should be understood that this invention is by no means limited to the specific embodiments disclosed herein, since many modifications can be made in the above described compound foils without departing from the basic teaching of this invention, which includes all modifications falling within the scope of the following claims.

I claim:

1. A compound foil for attaching an electrode to a semiconductor material, said compound foil comprising a relatively thin metal base foil made of a gold-antimony alloy containing a relatively low percentage of antimony, a relatively thin coating of antimony on one surface of said metal base foil, and a relatively thin coating of said gold-antimony alloy on said antimony coating.

2. The combination defined in claim 1 and also including a second relatively thin coating of antimony on the other surface of said metal base foil, and a relatively thin coating of said gold-antimony alloy on said antimony coating.

3. A compound wire adapted to be attached to a semiconductor material, said compound wire comprising a metal base wire made of a gold-antimony alloy containing a relatively low percentage of antimony, a relatively thin coating of antimony on the surface of said metal base wire, and a relatively thin coating of said gold-antimony alloy on said antimony coating.

4. A compound foil for attaching an electrode to a semiconductor material, said compound foil comprising a relatively thin metal base foil made of a metal selected from the group consisting of gold, silver, and alloys of gold-antimony and silver-antimony, said alloys containing a relatively low percentage of antimony, a relatively thin coating of antimony on one surface of said metal base foil, and a relatively thin coating of a metal selected from the group consisting of gold, silver, and alloys of gold-antimony and silver-antimony secured to the other side of said antimony coating.

References Cited by the Examiner

UNITED STATES PATENTS

| | | | |
|---|---|---|---|
| 2,746,134 | 5/56 | Drummond | 29—194 X |
| 2,821,014 | 1/58 | Miller | 29—144 |
| 2,959,505 | 11/60 | Riesz | 148—33 |
| 3,009,840 | 11/61 | Emeis | 148—33 X |
| 3,031,747 | 5/62 | Green. | |
| 3,045,334 | 7/62 | Berzins | 29—197.5 |

DAVID L. RECK, *Primary Examiner.*

HYLAND BIZOT, *Examiner.*